(12) United States Patent
Bourgoin et al.

(10) Patent No.: US 6,643,521 B1
(45) Date of Patent: Nov. 4, 2003

(54) METHOD OF PREDICTING THE RECEIVED POWER LEVEL AT A BASE STATION OF A CDMA NETWORK AND BASE STATION IMPLEMENTING THE METHOD

(75) Inventors: Cédric Bourgoin, Paris (FR); Christopher Cordier, Paris (FR); Alejandro De Hoz Garcia-Bellido, Boulogne-Billancourt (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/377,408

(22) Filed: Aug. 20, 1999

(30) Foreign Application Priority Data

Jul. 23, 1999 (EP) .............................. 99440209

(51) Int. Cl.$^7$ ................................ H04Q 7/20
(52) U.S. Cl. .......................... 455/522; 455/69
(58) Field of Search ................ 455/69, 115, 33.1, 455/54.1, 38.3, 522, 561, 550; 370/335, 342, 229, 235

(56) References Cited

U.S. PATENT DOCUMENTS 5,305,468 A * 4/1994 Bruckert et al. ............... 455/69
5,367,533 A * 11/1994 Schilling ........................ 375/1
6,011,956 A * 1/2000 Yamano et al. ............. 455/67.1
6,163,707 A * 12/2000 Miller ........................ 455/522

FOREIGN PATENT DOCUMENTS

EP          0 767 548 A2     4/1997
WO          WO 99/17582      4/1999

OTHER PUBLICATIONS

SIR–Based Call Admission Control for DS–CDMA Cellular Systems by Zhao Liu, Student Member, IEEE.*

* cited by examiner

*Primary Examiner*—Lester G. Kincaid
*Assistant Examiner*—Naghmeh Mehrpour
(74) *Attorney, Agent, or Firm*—Sughrue Mion, PLLC

(57) ABSTRACT

The invention concerns in particular a method of predicting a power level received by a base station assuming admission of a candidate user by the base station. According to the invention, the method consists in allowing for the impact of introducing the candidate user on the status of the system, this impact being reflected in an increase in the individual power levels of all users served by the base station.

9 Claims, 1 Drawing Sheet

METHOD OF PREDICTING THE RECEIVED POWER LEVEL AT A BASE STATION OF A CDMA NETWORK AND BASE STATION IMPLEMENTING THE METHOD

The field of the invention is that of evaluating power levels in a cell of a mobile radio network, in particular to determine the load of that cell and to apply a call admission control procedure.

BACKGROUND OF THE INVENTION

A mobile radio network includes base stations each of which serves mobile stations, known as active users, located in a cell associated with the base station. The signal transmitted by a mobile station to the base station is received by the station at a particular power level. Maintaining the total power level received from all active users within certain limits is essential to achieving good network performance by limiting the level of interference; the transmitted power level in one cell is perceived as interference in adjoining cells.

This is particularly true in a CDMA network, in which constant modification of the power transmitted by the mobile stations as a function of external conditions is critical for network efficiency. One way of maintaining the total received power level at the base station within certain limits is to verify if the additional connection is likely to increase the total received power level beyond the limit in the event of a request to connect an additional user, referred to as a candidate user, to a base station. The connection is granted only if the limit is not exceeded. This verification is based on evaluating the impact of connecting the candidate user on the total received power level at the base station.

The total received power level at the base station is the sum of three contributions. A first of these represents the individual power levels received from each of the users, a second represents an intercellular interference level, and a third represents a thermal noise level. The intercellular interference level corresponds to all of the individual received power levels at the base station concerned from all active users outside the cell associated with the base station concerned.

In the prior art, the impact of admitting a candidate user is determined by assuming that the base station receives a power contribution Prxtarget which is exactly the same from each user actually connected, referred to as an active user. This is in fact the ideal case that generates minimum interference between the various active users served by the base station. Admitting a candidate user is assumed to make an additional power contribution Prxtarget identical to that of the active users and added thereto. The term Prxtarget represents the received power level from each user at the base station. It is generally weighted by a coefficient associated with a user as a function of the type of service carried by the connection. This coefficient depends in particular on the activity on the line. Accordingly, the relationship between the received power level $\tilde{P}rxtot$ assuming that a candidate user is admitted and the power level Prxtot actually received from active users is of the form $\tilde{P}rxtot=Prxtot+\alpha_{N+1}Prxtarget$, where $\alpha_{N+1}$ is a coefficient associated with the candidate user as a function of the type of service required, the candidate user being added to N active users in the cell.

The drawback of the above method is that the assumption about admission of the user candidate takes no account of the modifications to the system that it causes.

Firstly, adding a further user represents a source of interference for the active users of the cell. To maintain exactly the same receive quality at the base station, each active user must increase its transmitted power level.

Secondly, adding a user increases the total power received by the base station serving the additional user. This increases the level of intercellular interference received by neighboring base stations. Using a power control mechanism, the neighboring stations cause the mobile stations they are serving to increase their transmitted power level in order to maintain a satisfactory signal-to-noise ratio. This increase in the power transmitted by active users served by neighboring base stations leads in turn to an increase in the interference level at the base station which admitted the candidate user. The base station requests all active users it is serving to increase their transmitted power level to maintain a satisfactory signal-to-noise ratio.

Allowing for the admission of the candidate user, and by virtue of the two effects described above, the individual power level that will be received at the base station from each active user will therefore be greater than the individual received power level that would be received at the base station from each active user if an additional user were not admitted.

OBJECTS AND SUMMARY OF THE INVENTION

One particular object of the present invention is to specify the relationship between the total received power levels at the base station before and after admitting an additional user.

Another object of the invention is to use that relationship to evaluate the load of a cell precisely.

The above objects, and others that become apparent hereinafter, are achieved by a method of predicting the level of power received at a base station assuming a candidate user is admitted and allowing for an increase in the individual power levels of all active users already being served by the base station. This method therefore takes account of the two effects described above.

The relationship between the received power level $\tilde{P}rxtot$ assuming that a candidate user is admitted and the power level Prxtot actually received from active users is preferably of the form $\tilde{P}rxtot=\alpha.Prxtot$ where $\alpha$ is a factor greater than 1 depending on the number of users already connected, on coefficients characteristic of the type of service used by each active user and on a coefficient characteristic of the type of service required by the candidate user.

The above relationship advantageously takes into account the increase in intercellular interference due to the admission of an additional user. The relationship is then of the form $\tilde{P}rxtot=\alpha.Prxtot+\beta$, where $\beta$ depends on the value of the intercellular interference before admitting a candidate user and also on the same parameters on which $\alpha$ depends.

In another embodiment of the invention, the relationship is used to predict the load of the cell corresponding to a base station if the base station admits an additional user. In this way the estimated value of the load of the cell indicates if admission is possible without exceeding the load limits of the cell. This method is preferably used in a base station to apply a call admission control procedure in order to avoid overloading the system.

BRIEF DESCRIPTION OF THE DRAWING

Other features and advantages of the invention will become apparent on reading the following description and from the accompanying drawing, in which.

MORE DETAILED DESCRIPTION

The invention therefore relates to a method of predicting a received power level at a base station of a mobile radio system.

Figure 1:
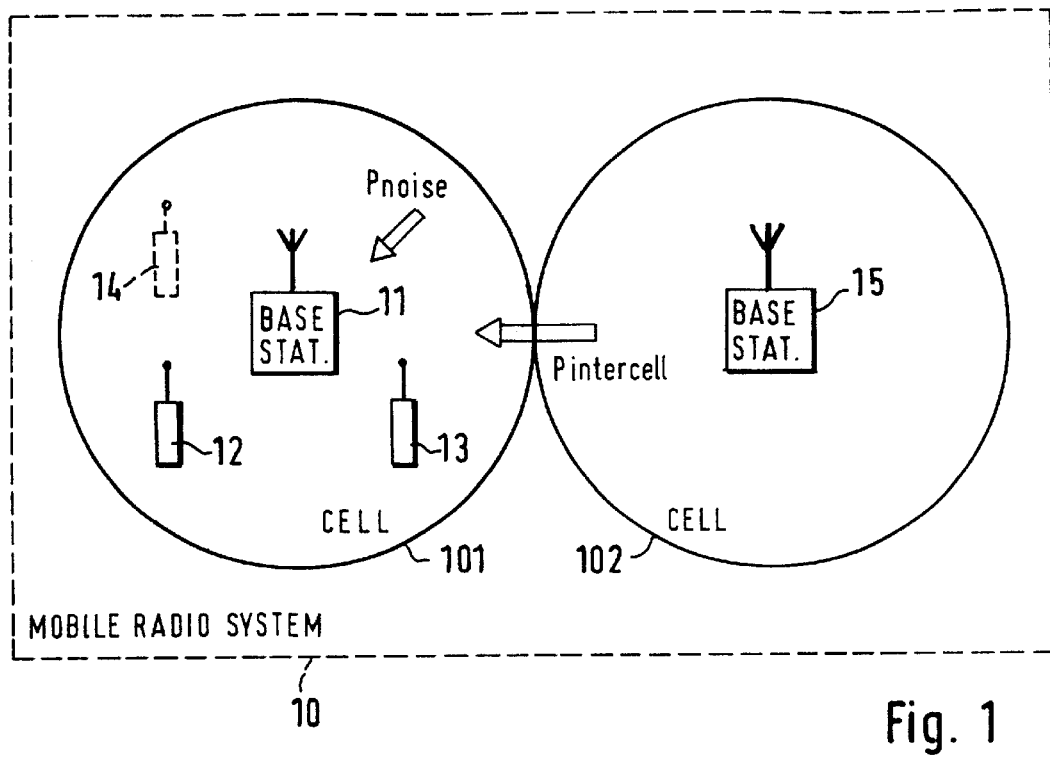
FIG. 1 represents a mobile radio system.

FIG. 1 shows a mobile radio system 10. A base station 11 is serving two active users 12 and 13 in the cell 101 of the base station 11. The base station 11 receives a power level $a_{12}.Prxtarget$ from user 12 and a power level $a_{13}.Prxtarget$ from user 13. The respective coefficients $a_{12}$, $a_{13}$ depend only on the type of service used by the users 12, 13. The value of the power level Prxtarget is determined by a conventional power monitoring mechanism. The base station 11 also receives an intercellular interference level Pintercell from a neighboring cell 102, in which there is a base station 15, and a thermal noise level Pnoise. The sum Prxtot of the various power levels received by the base station 11 has the value:

$$Prxtot = Pnoise + Pintercell + (a_{12} + a_{13}).Prxtarget \quad (R1)$$

The respective base stations 11, 15 of the cells 101, 102 are connected to a base station controller not shown in FIG. 1.

A candidate user 14 is also in the cell of the base station 11 and sends a connection request to the system. The method predicts the total power level $\tilde{P}rxtot$ that would be received by the base station 11 if the candidate user 14 were to become an active user, i.e. if the connection request were accepted by the base station 11. The method of the invention takes into account the impact of admitting the candidate user 14 on the mobile radio system 10 in that it considers that if the candidate user 14 were an active user:

- the individual power levels $a_{12}.\tilde{P}rxtarget$ and $a_{13}.\tilde{P}rxtarget$ received by the base station 11 from the respective active users 12, 13 would be greater than $a_{12}.Prxtarget$ and $a_{13}.Prxtarget$, respectively
- the power level received from the candidate user 14, if it were an active user, would be $a_{14}.\tilde{P}rxtarget$,
- the intercellular power level received would be greater than Pintercell by a factor $\Delta I$.

It follows from the above that Prxtot can be expressed in the following form:

$$\tilde{P}rxtot = Pnoise + (1+\Delta I).Pintercell + (a_{12}+a_{13}+a_{14}).\tilde{P}rxtarget \quad (R2)$$

These considerations lead to the system of equations S:

$$(Prxtot = Pnoise + Pintercell + (a_{12}+a_{13}).Prxtarget) \quad (R1)$$

$$(\tilde{P}rxtot = Pnoise + (1+\Delta I).Pintercell + (a_{12}+a_{13}+a_{14}).\tilde{P}rxtarget) \quad (R2)$$

In a preferred embodiment of the invention, a formula is established relating Prxtarget and Prxtot. In the prior art, the carrier to interference ratio C/I for a user, for example user 12, is defined as follows:

$$\frac{C}{I}target = \frac{Prxtarget}{Prxtot - a_{12} \cdot Prxtarget}.$$

Also, a constant $Npole_{12}$ is defined for user 12, as follows:

$$Npole_{12} = \frac{1}{\frac{C}{I}target}$$

and fixes the maximum capacity in terms of the number of users that the cell concerned can carry. This constant $Npole_{12}$ depends only on characteristics of the type of service used by the user concerned, here user 12. Simple mathematics produces a relationship R3 for user 12:

$$Prxtarget = \frac{1}{Npole_{12} \cdot a_{12}} \cdot Prxtot, \quad (R3)$$

An equivalent relationship can be deduced for all active users of the cell.

The relationship R3 is valid at any time. Accordingly, the relationship is also valid assuming admission of an additional user by the base station. For user 12, the following relationship is satisfied:

$$\tilde{P}rxtarget = \frac{\tilde{P}rxtot}{Npole_{12} \cdot a_{12}}. \quad (R4)$$

An equivalent relationship can be deduced for all active users of the cell and for the candidate user.

Allowing for relationships R3 and R4, and introducing for each user $i$ an associated factor $$k_i = \frac{a_i}{Npole_i + a_i}$$

depending only on the type of service used by that user, the solution of the system S results from obtaining a relationship R5 between $\tilde{P}rxtot$ and Prxtot in the form:

$$\tilde{P}rxtot = Prxtot \cdot \left[ \frac{1 - (k_{12} + k_{13})}{1 - (k_{12} + k_{13} + k_{14})} \right] + \frac{\Delta I \cdot Pintercell}{1 - (k_{12} + k_{13} + k_{14})}. \quad (R5)$$

The second term of the equation containing the term $\Delta I$ and reflecting the contribution due to the increase in intercellular interference is a second order term. In one particular embodiment of the invention this term can be neglected.

Figure 2:
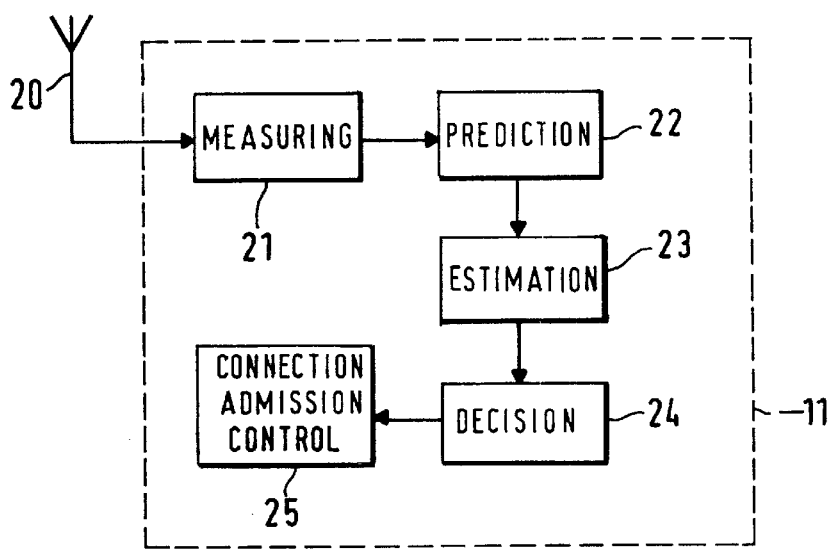
FIG. 2 represents a base station in which a call admission control method in accordance with the invention is implemented.

FIG. 2 shows the structure of the base station 11 in which a call admission control method is accordance with the invention is implemented.

The base station 11 comprises a receive antenna 20 enabling it to receive signals from the various users. The antenna 20 is connected to measuring means 21 for measuring the total received power level (Prxtot) at the antenna 20 for active users only. The measuring means 21 supply the measured power Prxtot to prediction means 22 which predict the power level $\tilde{P}rxtot$ that would be received at the base station 11 if the candidate user were to become an active user. The predicted power level is submitted to estimation means 23 which deduce from it the load of the cell that would result from admitting the candidate user. The value of the load of the cell is submitted to decision means 24 which determine whether the load of the cell from the estimation means 23 is compatible with admission of the candidate user by the base station. The decision means 24 inform connection admission control means 25 whether the candidate user can be accepted or not.

In the prior art, a formula giving the load of a cell X is $$X = 1 - \frac{Pnoise}{Prxtot}.$$

Accordingly, the estimated load of the cell $\tilde{X}$ on the assumption that the candidate user 14 is admitted is $$\tilde{X} = 1 - \frac{Pnoise}{\tilde{P}rxtot}$$

where $\tilde{P}rxtot$ is given by relationship R3.

The load of the cell assuming that the candidate user 14 is admitted should preferably remain below a limit $X_{lim}$ to prevent overloading the system. The limit $X_{lim}$ is generally in the range from 0.4 to 0.8.

Estimating the load of the cell is preferably based on an average value of Prxtot, the relationship R5 being equally valid if the average values of Prxtot and $\tilde{P}rxtot$ are considered. Considering the average values amounts to evaluating the average impact of the candidate user on the load of the cell instead of reasoning in terms of instantaneous values.

The invention applies for any number of active users already served by the base station 10 and using any data or voice services supported by the base station 10. The system of equations S and the relationships R1, R2, R3, R4 and R5 can be extended to all configurations of the system 10.

What is claimed is:

1. A method of predicting a received power level at a base station receiving signals transmitted by users, called active users, assuming the admission of an additional user, called a candidate user, by said base station, as a function of a power level actually received by said base station, said method consisting in, assuming admission of said candidate user by said base station, taking into account an increase in the individual power levels of said active users; wherein the relationship between said power level $\tilde{P}rxtot$ received by said base station assuming admission of said candidate user by said base station and said power level Prxtot actually received by said base station from said active users is of the form:

$$\tilde{P}rxtot = \alpha.Prxtot$$

where $\alpha$ is a factor greater than 1 depending on the number of said active users, on coefficients characteristic of the type of service used by each of said active users and on a coefficient characteristic of the type of service required by said candidate user.

2. A method according to claim 1, equally consisting in, assuming admission of said candidate user by said base station, taking account of an increase in intercellular interference.

3. A method according to claim 1, wherein, allowing for the increase in intercellular interference, said relationship is of the form:

$$\tilde{P}rxtot = \alpha.Prxtot + \beta$$

where $\beta$ is a term depending on the value of intercellular interference, on the number of said active users, on coefficients characteristic of the type of service used by each of said active users and on a coefficient characteristic of the type of service required by said additional user.

4. A method according to claim 1, equally consisting in:
 predicting the load of the cell of said base station if said base station were to admit said candidate user, and
 indicating to said base station if admission of said candidate user is possible or not.

5. A base station of a CDMA mobile radio network, said base station comprising:
 means for measuring the power level actually received by said base station from active users, and
 prediction means adapted to determine the power level received by said base station assuming admission of a candidate user by said base station, wherein said prediction means take account of an increase in the individual power levels of said active users assuming admission of said candidate user by said base station;
 wherein the relationship between said power level $\tilde{P}rxtot$ received by said base station assuming admission of said candidate user by said base station and said power level Prxtot actually received by said base station from said active users is of the form:

$$\tilde{P}rxtot = \alpha.Prxtot$$

where $\alpha$ is a factor greater than 1 depending on the number of said active users, on coefficients characteristic of the type of service used by each of said active users and on a coefficient characteristic of the type of service required by said candidate user.

6. A base station according to claim 5, wherein said prediction means equally take account, assuming admission of said candidate user by said base station, of an increase in intercellular interference.

7. A base station according to claim 5, equally including:
 means for estimating the load of the cell of said base station if said base station were to admit said candidate user, and
 decision means adapted to determine if said candidate user can be admitted by said base station.

8. A method, comprising:
 transmitting a first signal from a first mobile station and a second signal from a second mobile station to a base station of a mobile radio system, wherein the first and second mobile stations are admitted to the mobile radio system;
 determining a first total power level, the first total power level comprising a first individual power level, with which the first signal of the first mobile station is received by the base station, and a second individual power level, with which the second signal of the second mobile station is received by the base station;
 receiving an admission request signal from a third mobile station, which is seeking admission to the mobile radio system; and
 predicting a second total power level, with which signals of the first, second and third mobile stations would be received at the base station, if the third mobile station were to be admitted to the mobile radio system, taking into account an increase of the first and second individual power levels of the first and second mobile stations, respectively.

9. A base station of a mobile radio system, comprising:
 a measuring device structured to measure a first total power level, the first total power level comprising a first individual power level, with which a first signal of a first mobile station is received by the base station, and a second individual power level, with which a second signal of a second mobile station is received by the base station, wherein the first and second mobile stations are admitted to the radio mobile system;

a receiver structured to receive an admission request signal from a third mobile station, which is seeking admission to the mobile radio system; and a predictor device structured to predict a second total power level, with which signals of the first, second and third mobile stations would be received at the base station, if the third mobile station were to be admitted to the mobile radio system, taking into account an increase of the first and second individual power levels of the first and second mobile stations, respectively.

* * * * *